United States Patent
Lee et al.

(10) Patent No.: US 12,497,010 B2
(45) Date of Patent: Dec. 16, 2025

(54) AUTOMOTIVE AIR PRESSURE SPRING BRAKE CHAMBER HAVING CAGING BOLT ASSEMBLY

(71) Applicant: MIRAEVC CO., LTD., Jeollabuk-do (KR)

(72) Inventors: Seunghoon Lee, Jeollabuk-do (KR); Soonsik Myung, Jeollabuk-do (KR); Byungyong Kang, Jeollabuk-do (KR)

(73) Assignee: MIRAEVC CO., LTD., Jeollabuk-Do (KR)

(*) Notice: Subject to any disclaimer, the term of this patent is extended or adjusted under 35 U.S.C. 154(b) by 165 days.

(21) Appl. No.: 18/013,018

(22) PCT Filed: Oct. 8, 2021

(86) PCT No.: PCT/KR2021/013903
§ 371 (c)(1),
(2) Date: Dec. 27, 2022

(87) PCT Pub. No.: WO2023/058794
PCT Pub. Date: Apr. 13, 2023

(65) Prior Publication Data
US 2024/0101091 A1 Mar. 28, 2024

(30) Foreign Application Priority Data
Oct. 8, 2021 (KR) .................. 10-2021-0133860

(51) Int. Cl.
*B60T 13/38* (2006.01)
*B60T 13/04* (2006.01)

(52) U.S. Cl.
CPC .............. *B60T 13/38* (2013.01); *B60T 13/04* (2013.01)

(58) Field of Classification Search
CPC .......... F16B 39/10; B60T 13/04; B60T 13/38; B60T 8/42; B60T 17/083; B60T 17/086
(Continued)

(56) References Cited

U.S. PATENT DOCUMENTS 5,640,894 A * 6/1997 Zarybnicky, Sr. .... B60T 17/083
29/888.06
5,943,940 A * 8/1999 Angerfors ............. B60T 17/086
91/363 R (Continued)

FOREIGN PATENT DOCUMENTS

KR 10-1539892 B1 7/2015
KR 10-1567709 B1 11/2015

*Primary Examiner* — Robert A. Siconolfi
*Assistant Examiner* — San M Aung
(74) *Attorney, Agent, or Firm* — The PL Law Group, PLLC

(57) ABSTRACT

An automotive air pressure spring brake chamber includes a head housing, a bottom housing, an adaptor housing between the head housing and the bottom housing, a piston between the head housing and the adaptor housing, a hollow actuator rod coupled to the piston, and a caging bolt assembly moving through the actuator rod by rotation of a caging bolt and being disposed along the through-hole of the adaptor housing, in which a caging nut is coupled to an end of the caging bolt. The caging bolt assembly includes a caging bolt body having a caging bolt head at an upper end, an indicator coupled in an axial direction through the caging bolt body, a nut stopper coupled to an end of the indicator, the caging nut screw-coupled to an outer circumferential surface of the caging bolt body, and an elastic structure between the indicator and the caging bolt body.

1 Claim, 7 Drawing Sheets

(58) Field of Classification Search
USPC .......................................................... 188/167
See application file for complete search history.

(56) References Cited

U.S. PATENT DOCUMENTS

| | | | | |
|---|---|---|---|---|
| 6,588,314 | B1* | 7/2003 | Stojic | B60T 17/083 |
| | | | | 92/63 |
| 2004/0182659 | A1* | 9/2004 | Siebke | B60T 17/085 |
| | | | | 188/167 |
| 2009/0134697 | A1* | 5/2009 | Savagner | B60T 17/083 |
| | | | | 188/301 |
| 2010/0269690 | A1* | 10/2010 | Lanquetot | B60T 17/086 |
| | | | | 92/5 R |
| 2020/0398808 | A1* | 12/2020 | Franczuk | B60T 17/22 |

\* cited by examiner

Forcibly inserted indicator

AUTOMOTIVE AIR PRESSURE SPRING BRAKE CHAMBER HAVING CAGING BOLT ASSEMBLY

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/013903 filed on Oct. 8, 2021, which claims priority to the benefit of Korean Patent Application No. 10-2021-0133860 filed in the Korean Intellectual Property Office on Oct. 8, 2021, the entire contents of which are incorporated herein by reference.

BACKGROUND

1. Technical Field

The present disclosure relates to an automotive air pressure spring brake chamber having a caging bolt assembly, and more particularly, to an automotive air pressure spring brake chamber having a caging nut separation prevention structure in an actuator rod.

2. Background Art

Large scale vehicles such as buses, trucks, trailers and other heavy vehicles use automotive brake chambers that can provide sensitive and fast braking action while driving at high speed or parking and outstanding braking performance.

In relation to the automotive brake chamber, Korean Patent No. 10-1567709 discloses a brake actuator. The automotive brake chamber includes a hollow head housing, an adaptor housing and a bottom housing in a sequential order from top. Meanwhile, a piston is disposed between the head housing and the adaptor housing, and a hollow actuator rod is coupled to the piston and disposed through a through-hole of the adaptor housing. A diaphragm is disposed between the adaptor housing and the bottom housing. Additionally, a pressure plate supports the diaphragm, and a push rod supports the pressure plate. The push rod is disposed through a through-hole of the bottom housing.

Through this structure, a space between the head housing and the piston is a spring chamber, and a spring is disposed between them. A space between the piston and the adaptor housing is a pressure chamber. A space between the adaptor housing and the diaphragm is a service chamber, and a pushrod chamber is formed between the diaphragm and the bottom housing.

As described above, the automotive brake chamber includes the spring chamber, the pressure chamber, the service chamber and the pushrod chamber from top to bottom, and the pushrod connected through the lower end of the bottom housing moves with the upward and downward movement of the pressure plate by the adjustment of the elastic force of the spring and the air pressure in the service chamber in order to brake on the vehicle while driving or parking.

In this instance, the pushrod plays a role in braking as it moves up and down, and when there is a problem with the braking action, a change occurs in the pushrod stroke. However, the brake actuator of Korean Patent No. 10-1567709 does not have any configuration for determining if there is an abnormality or a small change in the pushrod stroke, thereby failing to repair the pushrod chamber beforehand.

SUMMARY

The present disclosure relates to an automotive air pressure spring brake chamber having a nut stopper coupled to an end of an indicator disposed through a caging bolt to prevent the separation of a caging nut that moves up and down by the rotation of the caging bolt in an actuator rod.

To achieve the above-described objective, an automotive air pressure spring brake chamber having a caging bolt assembly according to the present disclosure includes a head housing, a bottom housing, an adaptor housing between the head housing and the bottom housing, a piston between the head housing and the adaptor housing, a hollow actuator rod coupled to the piston and disposed through a through-hole of the adaptor housing, and the caging bolt assembly which moves through the actuator rod by rotation of a caging bolt and is disposed along the through-hole of the adaptor housing, in which a caging nut is coupled to an end of the caging bolt, wherein the caging bolt assembly includes a caging bolt body having a caging bolt head at an upper end, an indicator coupled in an axial direction through the caging bolt body, a nut stopper coupled to an end of the indicator, the caging nut screw-coupled to an outer circumferential surface of the caging bolt body, and an elastic structure between the indicator and the caging bolt body, and wherein a separation of the caging nut is prevented through the nut stopper coupled to the end of the indicator disposed through the caging bolt to prevent the separation of the caging nut which moves up and down by the rotation of the caging bolt in the actuator rod.

The indicator rod includes a rod body having a predetermined diameter, a rod head stepped with a larger diameter than the rod body at an upper end of the rod body, and a stopper coupling groove to allow for coupling of the nut stopper below the rod head, and a side of the elastic structure contacts a stepped portion with the rod head and an opposite side contacts an upper step portion in the bolt body.

As described above, the present disclosure prevents the separation of the caging nut through the nut stopper coupled to the end of the indicator disposed through the caging bolt to prevent the separation of the caging nut that moves up and down by the rotation of the caging bolt in the hollow actuator rod disposed through the through-hole of the adaptor housing in a state that the hollow actuator rod is coupled to the piston between the head housing and the adaptor housing among the hollow head housing, the adaptor housing and the bottom housing in a sequential order from top.

That is, the present disclosure provides the nut stopper coupled to the end of the indicator disposed along the axial direction in the caging bolt body to prevent the separation of the caging nut screw-coupled to the outer surface of the caging bolt body passing through and rotatably coupled to the piston in a state that the caging bolt body is disposed in the hollow actuator rod, thereby preventing the sudden separation of the caging nut.

DETAILED DESCRIPTION

Figure 1:
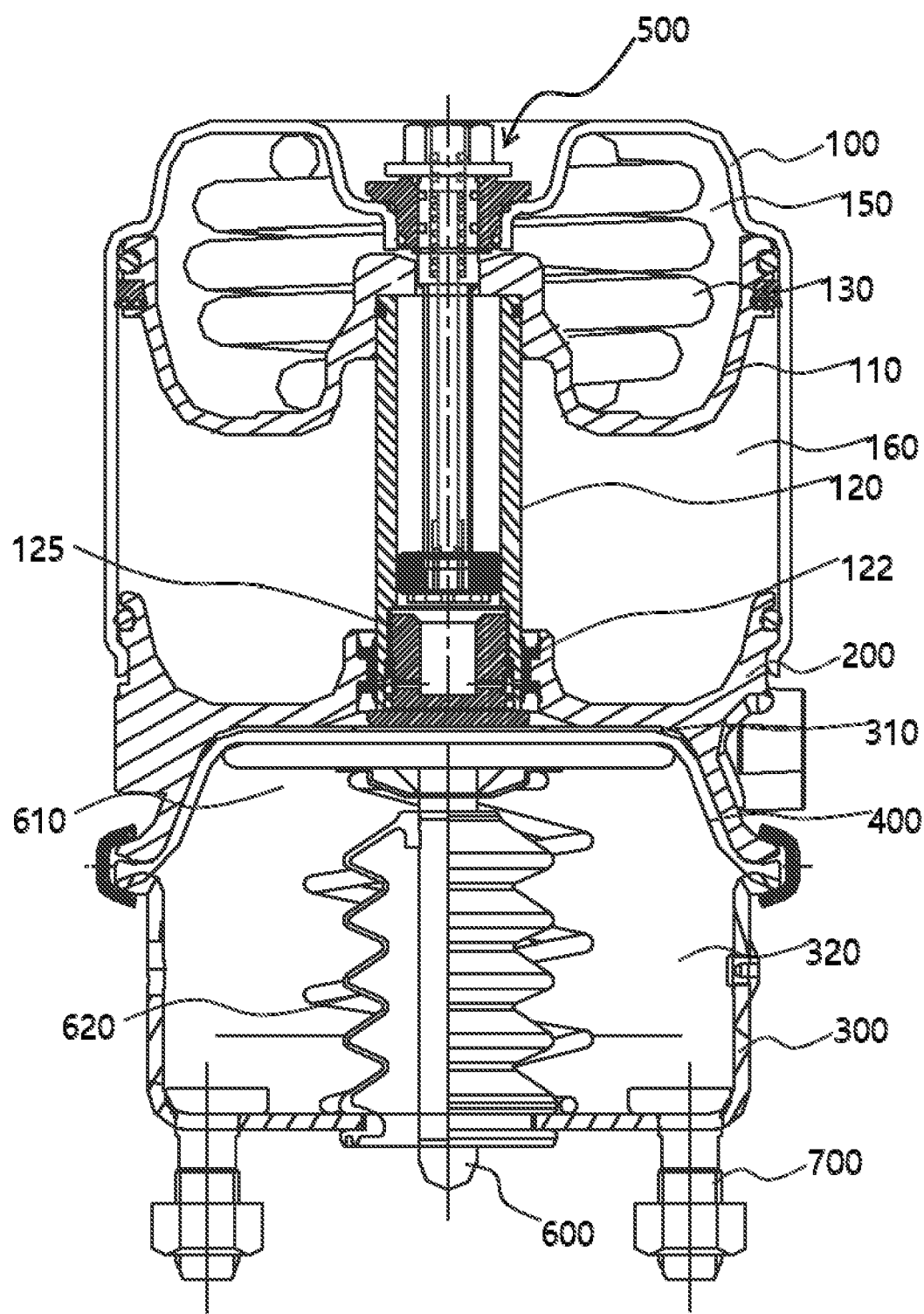
FIG. 1 is a diagram showing an automotive air pressure spring brake chamber having a caging bolt assembly according to an embodiment of the present disclosure.
Figure 2:
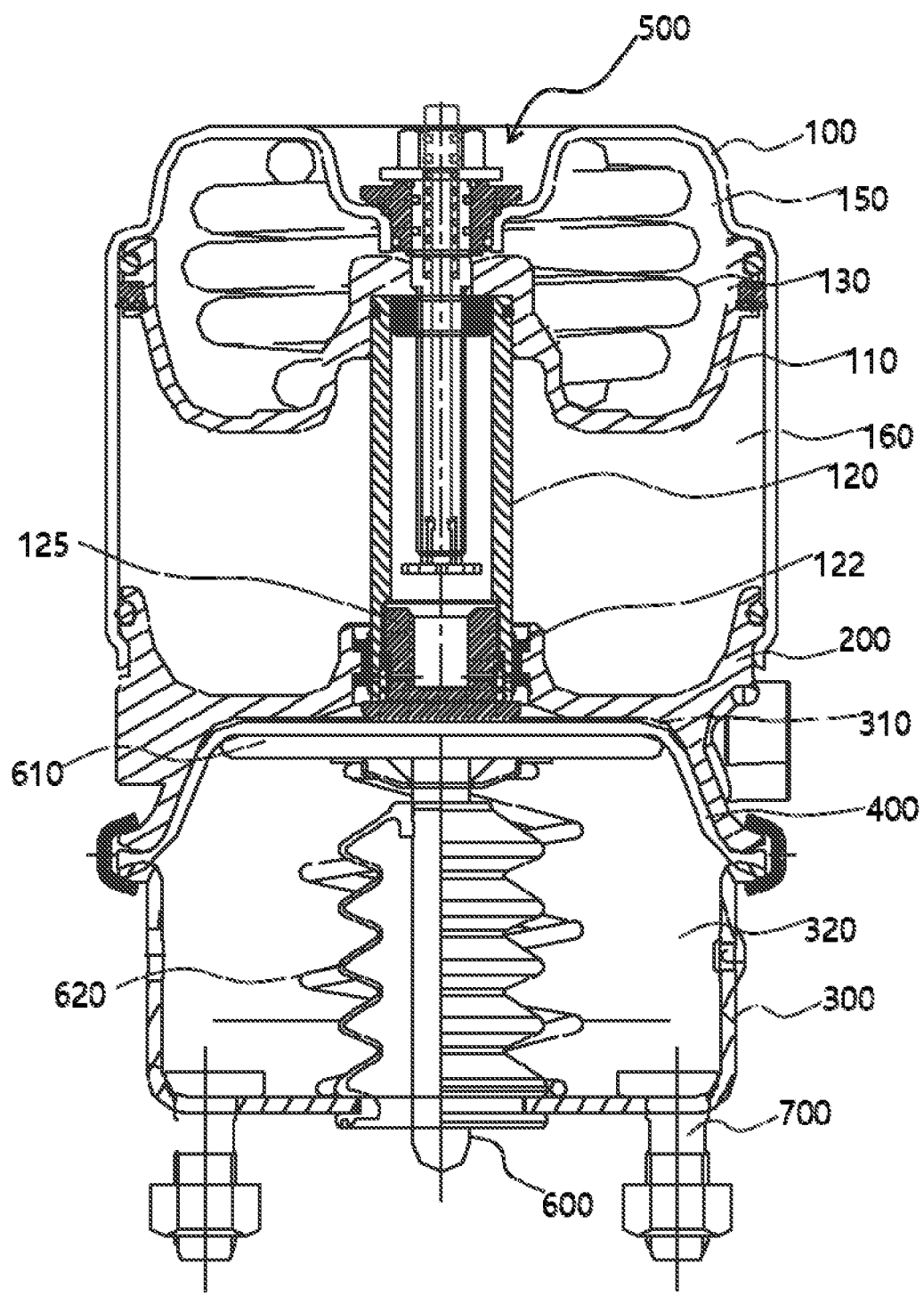
FIG. 2 shows a caged state in which a portion of an indicator rod of a caging bolt assembly protrudes outward.
Figure 3:
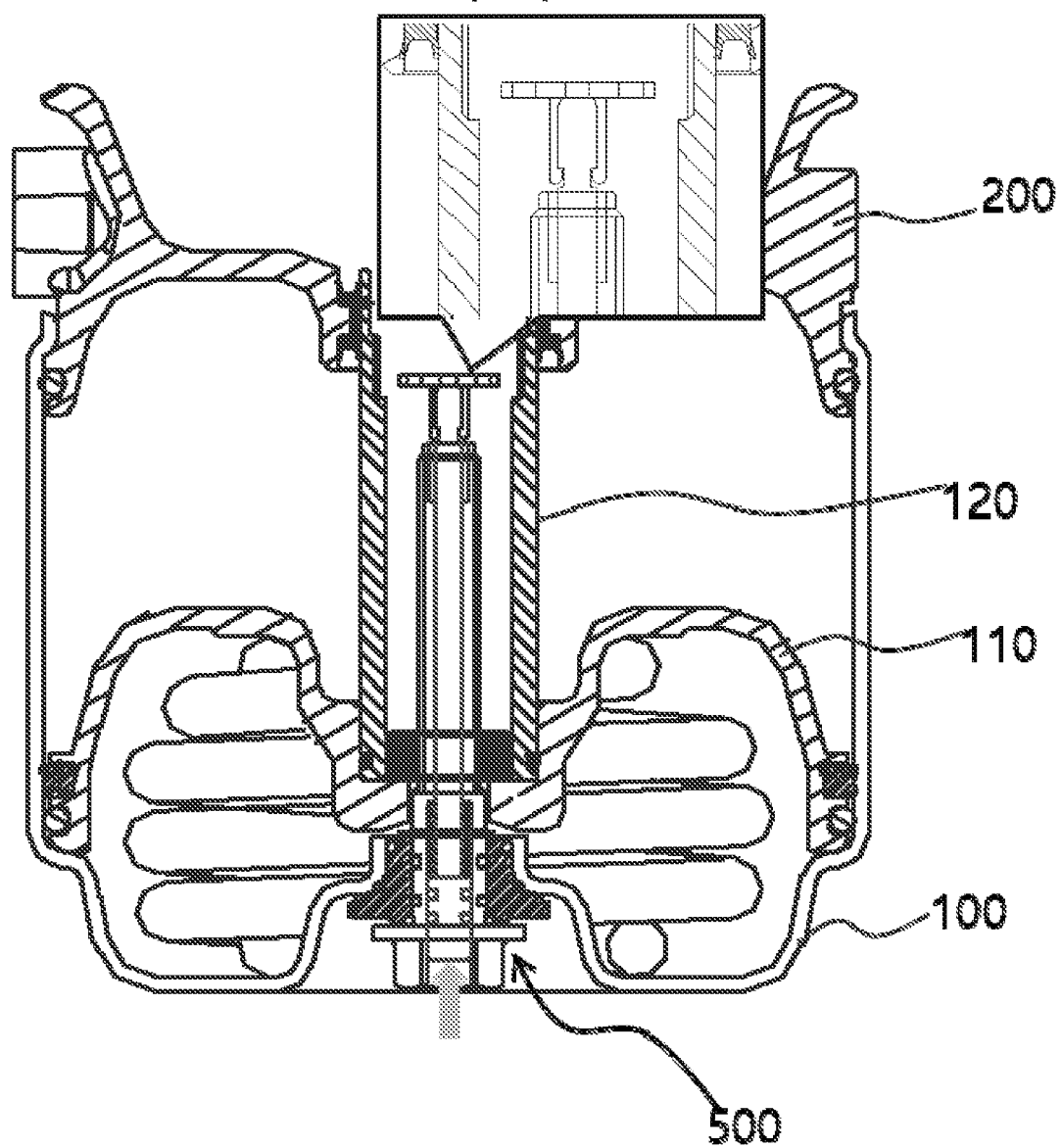
FIG. 3 shows a caging nut stopper assembled in a rod protrusive state.
Figure 4:
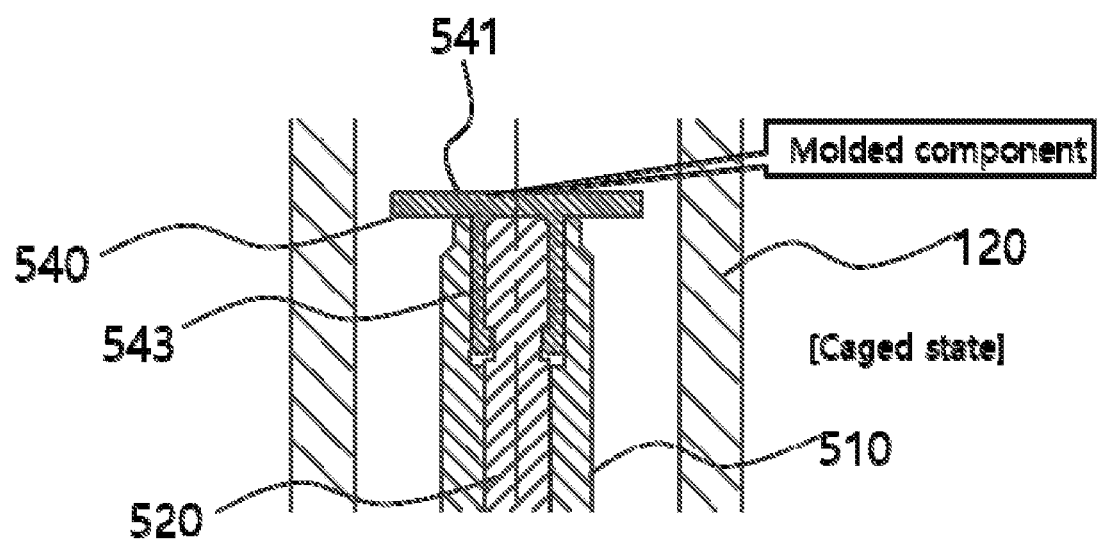
FIG. 4 shows a caged state in which a nut stopper coupled to the end of an indicator rod is inserted into and coupled to a bolt body.
Figure 5:
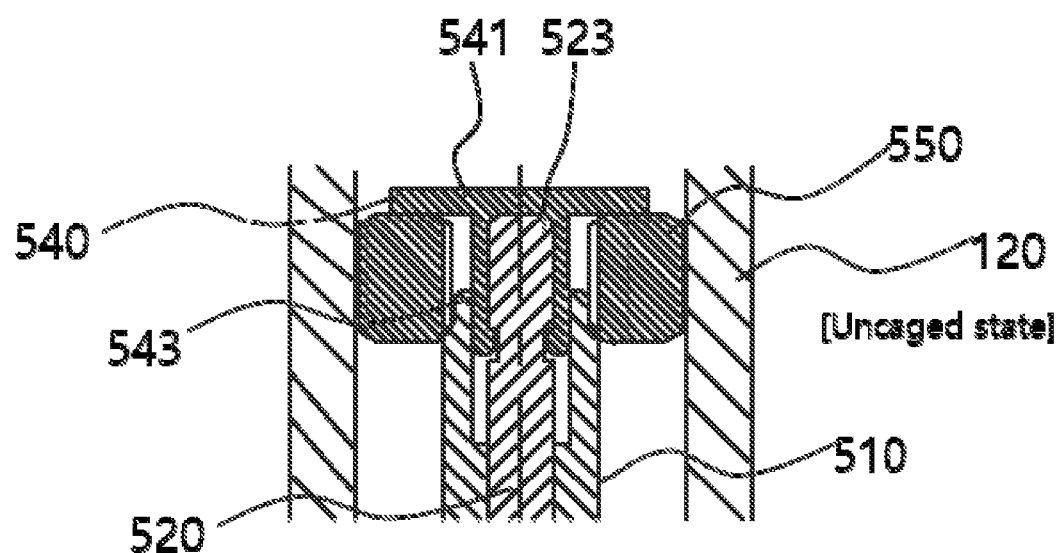
FIG. 5 shows an uncaged state in which a nut stopper coupled to the end of an indicator rod is exposed through a bolt body.
Figure 6:
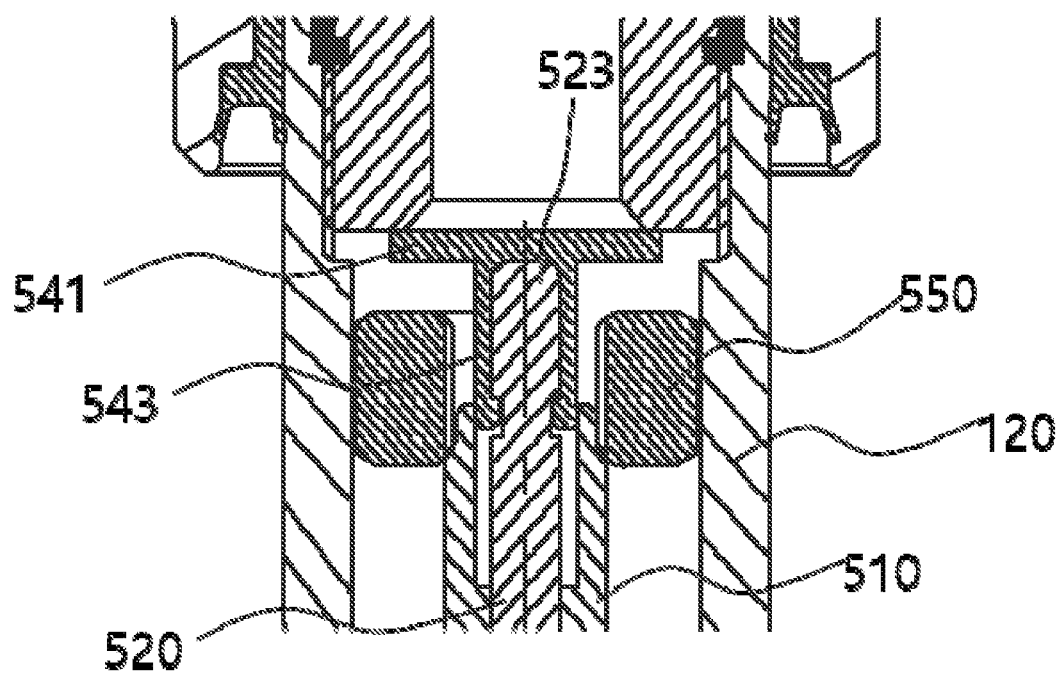
FIG. 6 shows an indicator rod forcibly inserted into a bolt body by applying the pressure to the end of the indicator rod.
Figure 7:
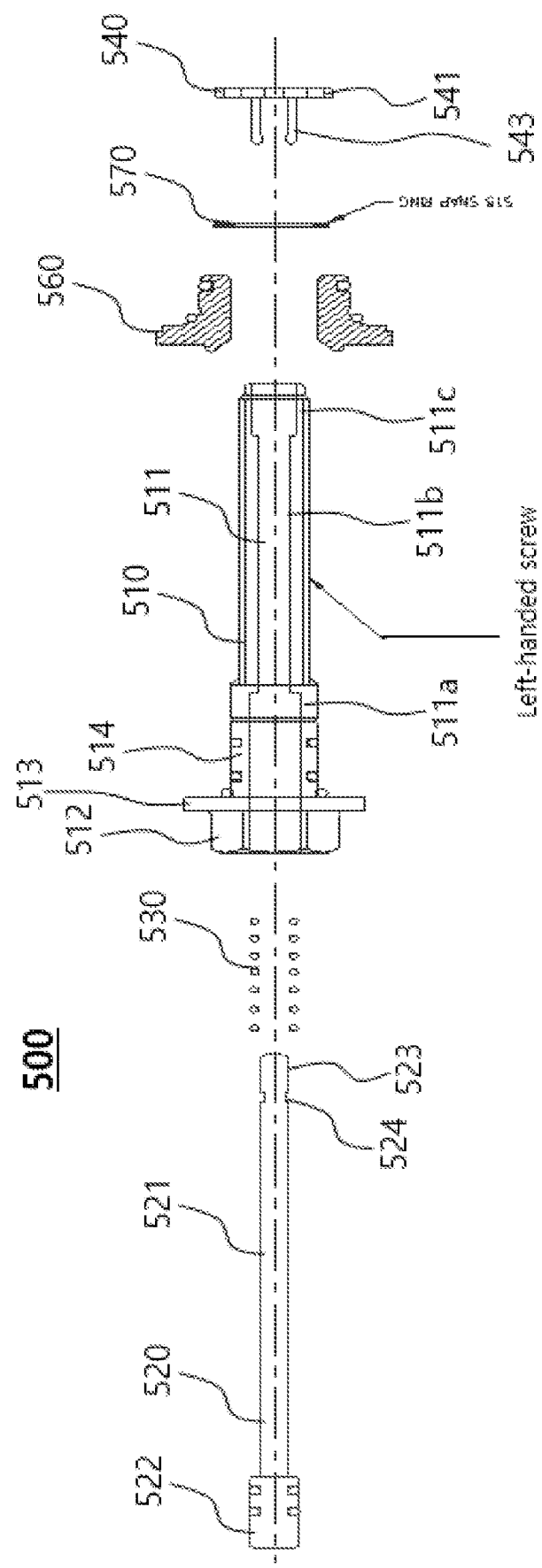
FIG. 7 is an exploded diagram of a caging bolt assembly.

Hereinafter, the embodiments of the present disclosure will be described in more detail with reference to the accompanying drawings. However, the present disclosure is not limited to the following disclosed embodiments and will be embodied in a variety of different forms, and these embodiments are provided so that this disclosure will be thorough and complete, and will fully convey the scope of the present disclosure to those skilled in the art. In the drawings, like reference signs denote like elements.

In adding the reference signs to the elements in each drawing, it should be noted that like elements have like reference signs as possible although they are shown in different drawings. Additionally, in describing the present disclosure, when it is determined that a certain detailed description of relevant known elements or functions may obscure the subject matter of the present disclosure, the detailed description is omitted.

To begin with, an automotive air pressure spring brake chamber includes a hollow head housing 100, an adaptor housing 200 and a bottom housing 300 in a sequential order from top, a piston 110 is disposed between the head housing 100 and the adaptor housing 200, and a diaphragm 400 between the adaptor housing 200 and the bottom housing 300.

Meanwhile, the automotive air pressure spring brake chamber includes an actuator rod 120 having a through-hole disposed through the adaptor housing 200 in the downward direction of a piston through-hole of the piston 110, and a rod valve is disposed at the end of the actuator rod 120. The rod valve makes a spring chamber 150 and a service chamber 310 to communicate with each other to allow air flow. In this embodiment, the piston 110 and the actuator rod 120 are separately formed, but they may be integrally formed.

In the automotive air pressure spring brake chamber, the air flow between the spring chamber 150 and the service chamber 310 is made through the hollow actuator rod 120 between the spring chamber 150 and the service chamber 310 and the actuator rod valve coupled to the lower end of the actuator rod 120.

The automotive air pressure spring brake chamber as described above includes the spring chamber 150 between the head housing 100 and the piston 110, and a pressure chamber 160 between the piston 110 and the adaptor housing 200. Additionally, the automotive air pressure spring brake chamber includes the service chamber 310 between the adaptor housing 200 and the diaphragm 400, and a pushrod chamber 320 between the diaphragm 400 and the bottom housing 300.

A compression spring 130 disposed in the spring chamber 150 is a coil spring, and the outer diameter of the coil may be smaller as it goes from the center of the coil to two ends. In this instance, one end of the compression spring 130 is supported in contact with the piston 110, and the other end of the compression spring 130 is supported in contact with a bent portion of the head housing 100.

Meanwhile, the head housing 100 has the bent portion along the inner side of the head housing 100 at the upper part thereof to prevent the compression spring 130 from moving at the upper part, so that the compression spring 130 is compressed while always keeping the center axis constant.

The piston 110 is in close contact with the inside of the head housing 100 and divides the internal space of the head housing 100 into the spring chamber 150 and the pressure chamber 160. The hollow actuator rod 120 is disposed in a direction along the piston through-hole. Accordingly, one end of the actuator rod 120 may be connected to and supported on the piston 110, and the other end may be supported on the diaphragm 400 through the through-hole of the adaptor housing 200.

A lip seal 122 is disposed at the contact area of the outer circumferential surface of the actuator rod 120 and the inner circumferential surface of the adaptor housing 200 to prevent fluid leaks. That is, the lip seal 122 is assembled on the through-hole at the center of the adaptor housing 200, and the actuator rod 120 operates through the lip seal 122. The lip seal 122 performs a sealing function to prevent the movement of air pressure between the pressure chamber and the service chamber.

An actuator rod cover 125 has an air flow hole on the side at the lower end, and a pilot lip seal is assembled on the flow hole and acts as a valve to allow and prevent the air flow between the spring chamber 150 and the service chamber 310. The Inventor's Korean Patent Nos. 10-1567709 and 10-1539892 disclose technology related to the actuator rod cover 125 and its detailed description is omitted.

A caging bolt assembly 500 is disposed in the actuator rod 120 through the head housing 100 and the piston 110.

The caging bolt assembly 500 includes a caging bolt body 510 having an indicator insertion hole 511, an indicator 520 moveably coupled in the axial direction within the caging bolt body 510, an elastic structure 530 between the caging bolt body 510 and the indicator 520, a nut stopper 540 coupled to the end of the indicator disposed along the axial direction in the caging bolt body to prevent the separation of a caging nut, the caging nut 550 screw-coupled to the outer surface of the caging bolt body 510, a boss head 560 disposed between the head housing 100 and the caging bolt body 510 to allow the caging bolt body 510 to rotate, and a snap ring 570 coupled to the lower end of the boss head 560.

The caging bolt body 510 includes a caging bolt head 512 exposed through the head housing 100, a caging bolt head flange 513 stepped as part of the caging bolt head at the lower end of the caging bolt head 512, and a rotating portion 514 to which the boss head 560 is coupled at the lower end of the caging bolt head flange 513.

The indicator insertion hole 511 has an upper insertion hole 511a which functions to restrict the movement of an indicator head 521 of the indicator 520, a lower insertion hole 511c which defines an insertion area of the nut stopper 540 coupled to the indicator 520, and an intermediate insertion hole 511b which is a space connecting the upper insertion hole 511a to the lower insertion hole 511c. The lower insertion hole 511c and the upper insertion hole 511a have a larger diameter than the intermediate insertion hole 511b.

The indicator 520 has a rod body 521 having a predetermined diameter, an indicator head 522 disposed on the upper insertion hole 511a and stepped with a larger diameter than the rod body at the upper end of the rod body, and a stopper coupling portion 523 opposite the indicator head 522 and to which the nut stopper 540 is coupled. A nut stopper coupling groove 524 is formed at the inward end of the stopper coupling portion 523 on the indicator 520. The nut stopper coupling groove 524 allows for the coupling of the nut stopper below the indicator head 522, and one side of the elastic structure 530 contacts the stepped portion with the indicator head 522, and the opposite side contacts the upper insertion hole 511a in the caging bolt body 510.

The nut stopper 540 includes a stopper plate 541 having a plate shape, and a stopper coupling hole 543 which is extended on the inner surface of the stopper plate 541 and is fit-coupled to the nut stopper coupling groove 524 of the indicator 520 while surrounding the stopper coupling portion 523.

The caging bolt assembly 500 functions to forcibly compress the power spring, and is used when mounting or forcibly removing the vehicle having no air pressure from the parked position. The drawing shows the forcibly compressed and fixed state, and after mounted in the vehicle, for normal operation, the caging bolt should be firmly tightened to the chamber head, and in other words, the caging bolt is not in protrusive state.

A mounting bolting structure 700 functions to fix the automotive air pressure spring brake chamber to the bracket or caliper of the vehicle. The mounting bolting structure 700 has a mounting bolt and a mounting nut.

The adaptor housing 200 is disposed between the head housing 100 and the bottom housing 300 to interconnect the head housing 100 and the bottom housing 300. The adaptor housing 200 has the through-hole at the center, and the actuator rod 120 is supported in contact with the diaphragm 400 through the through-hole.

Meanwhile, the diaphragm 400 is disposed in the bottom housing 300 and supported in contact with a pushrod plate 610, and divides the bottom housing 300 into the service chamber 310 and the pushrod chamber 320. In this instance, the pushrod plate 610 is supported by a pushrod 600, and plays a role in transmitting the movement by the air pressure of the diaphragm 400 to the pushrod 600. A pushrod spring 620 is disposed between the pushrod plate 610 and the bottom housing 300 along the axial direction of the pushrod 600 and is compressed or restored by the movement of the pushrod plate 610.

The present disclosure prevents the separation of the caging nut through the nut stopper coupled to the end of the indicator disposed through the caging bolt to prevent the separation of the caging nut that moves up and down by the rotation of the caging bolt in the hollow actuator rod disposed through the through-hole of the adaptor housing in a state that the hollow actuator rod is coupled to the piston between the head housing and the adaptor housing among the hollow head housing, the adaptor housing and the bottom housing in a sequential order from top.

The foregoing description is made to describe the technical spirit of the present disclosure for illustrative purposes, and it is obvious to those skilled in the art that a variety of modifications and change may be made thereto without departing from the essential features of the present disclosure. Therefore, the embodiments disclosed herein are provided to describe the technical spirit of the present disclosure and not intended to be limiting, and the technical spirit and scope of the present disclosure is not limited by the embodiments. The scope of protection of the present disclosure should be interpreted by the appended claims, and it should be interpreted that the scope of protection of the present disclosure covers all the technical spirit within the equivalent scope.

What is claimed is:

1. An automotive air pressure spring brake chamber comprising:
    a head housing;
    a bottom housing;
    an adaptor housing between the head housing and the bottom housing;
    a piston between the head housing and the adaptor housing;
    a hollow actuator rod coupled to the piston and disposed through a through-hole of the adaptor housing; and
    a caging bolt assembly configured to move through the hollow actuator rod by rotation of a caging bolt, the caging bolt assembly disposed along the through-hole of the adaptor housing, in which a caging nut is coupled to an end of the caging bolt, the caging bolt assembly comprising:
        a caging bolt body having a caging bolt head at an upper end and an indicator insertion hole;
        an indicator coupled in an axial direction through the caging bolt body;
        a nut stopper coupled to an end of the indicator;
        the caging nut screw-coupled to an outer circumferential surface of the caging bolt body; and
        an elastic structure between the indicator and the caging bolt body,
    wherein the indicator comprises:
        a rod body having a predetermined diameter;
        a rod head stepped with a larger diameter than the rod body at an upper end of the rod body; and
        a stopper coupling groove configured to allow for coupling of the nut stopper below the rod head,
    wherein a side of the elastic structure is configured to contact a stepped portion with the rod head and an opposite side of the elastic structure contacts an upper step portion in the bolt body,
    wherein the indicator insertion hole comprises:
        an upper insertion hole configured to restrict a movement of the rod head of the indicator;
        a lower insertion hole configured to define an insertion area of the nut stopper; and
        an intermediate insertion hole which is a space connecting the upper insertion hole to the lower insertion hole, the intermediate insertion hole having a smaller diameter than the lower insertion hole and the upper insertion hole,
    wherein the nut stopper comprises:
        a stopper plate having a plate shape; and
        a stopper coupling hole extended on an inner surface of the stopper plate and fit-coupled to the stopper coupling groove of the indicator to maintain the stopper plate in an axially fixed position,
    wherein the stopper plate is inserted into the lower insertion hole of the caging bolt body and is held in place by engagement with the stopper coupling groove of the indicator,
    wherein the stopper plate surrounds a stopper coupling portion of the indicator and contributes to preventing separation of the caging nut disposed through the caging bolt,
    wherein a separation of the caging nut is prevented through the nut stopper coupled to the end of the indicator disposed through the caging bolt to prevent the separation of the caging nut which moves up and down by the rotation of the caging bolt in the actuator rod.

\* \* \* \* \*